United States Patent [19]
Prater

[11] 3,866,964
[45] Feb. 18, 1975

[54] CARPET STRETCHER WITH TELESCOPING TUBING LOCKING DEVICE
[75] Inventor: Earle F. Prater, Long Beach, Calif.
[73] Assignee: Roberts Consolidated Industries, Inc., City of Industry, Calif.
[22] Filed: Dec. 26, 1973
[21] Appl. No.: 427,578

[52] U.S. Cl. ................. 294/8.6, 403/104, 403/374
[51] Int. Cl. ........................................... A47g 27/04
[58] Field of Search ............. 294/8.6, 19 R, 93, 94, 294/96; 254/57–63; 403/104, 374

[56] References Cited
UNITED STATES PATENTS

| | | | |
|---|---|---|---|
| 1,231,262 | 6/1917 | Katchmazenski | 294/96 X |
| 1,859,223 | 5/1932 | Stevenson | 403/104 X |
| 1,867,289 | 7/1932 | Ventresca | 294/96 X |
| 2,329,932 | 9/1943 | Nelson | 403/104 X |
| 2,555,515 | 6/1951 | Slater | 403/104 X |
| 2,695,504 | 11/1954 | Magee | 403/104 X |
| 2,947,556 | 8/1960 | Wenger | 403/104 X |
| 3,359,032 | 12/1967 | Kochanowski | 294/8.6 |

Primary Examiner—Richard A. Schacher
Assistant Examiner—Johnny D. Cherry
Attorney, Agent, or Firm—Harris, Kern, Wallen & Tinsley

[57] ABSTRACT

A carpet stretcher having a pair of telescoping tubings, with locking means between the tubings permitting them to be adjusted longitudinally with respect to each other to an infinite number of positions and locked in any desired such position, with trigger means outside said tubings and manually operable to release said locking means to permit free relative longitudinal movement between the tubings.

7 Claims, 5 Drawing Figures

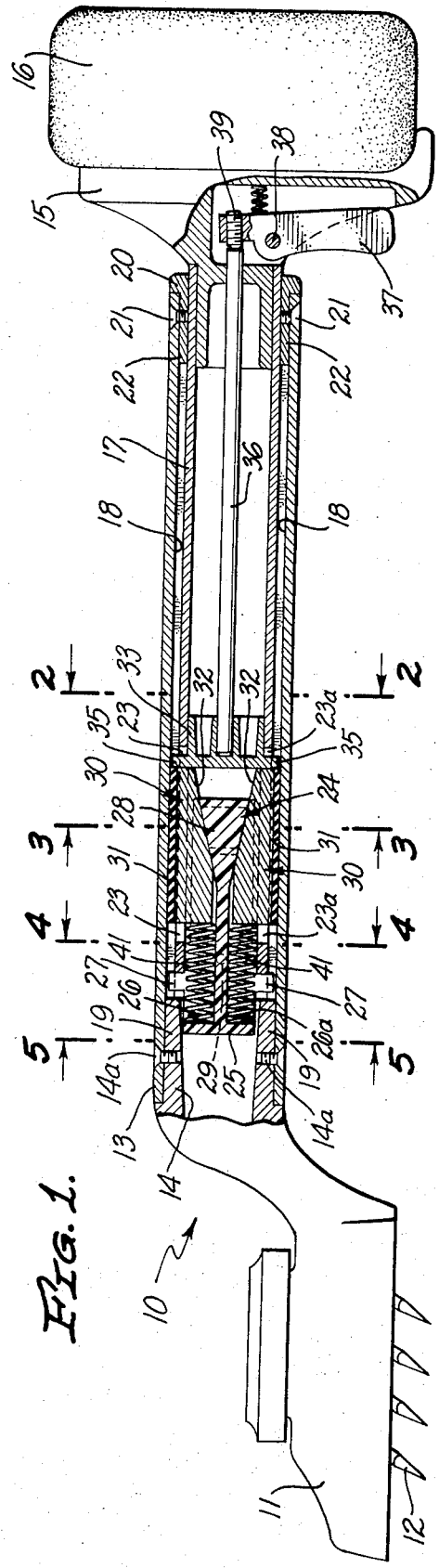
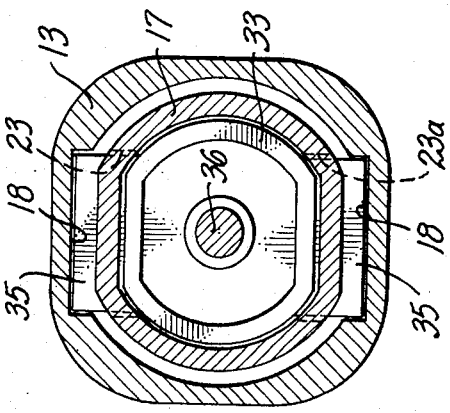
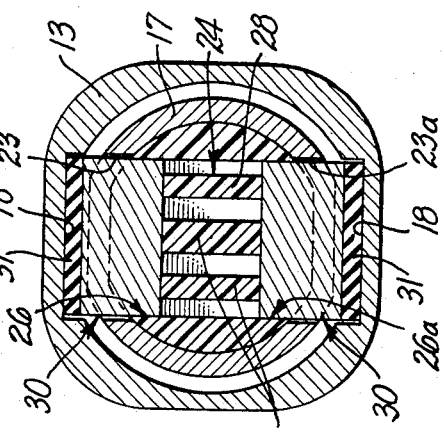
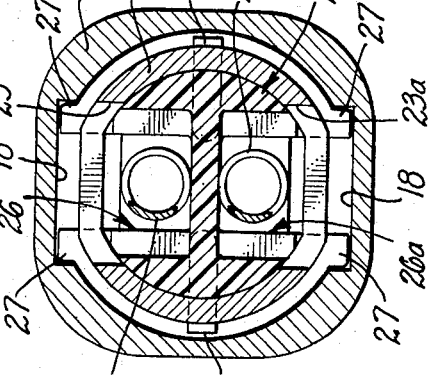
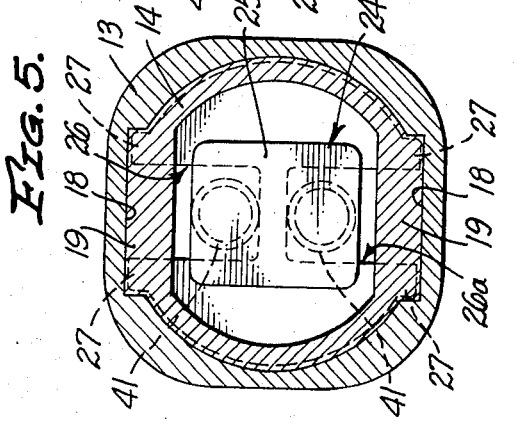

CARPET STRETCHER WITH TELESCOPING TUBING LOCKING DEVICE

BACKGROUND OF THE INVENTION

The present invention relates to a carpet stretching device usable in stretching carpet as it is laid upon flooring. In the preferred embodiment disclosed it is applied to a carpet stretcher of the type known as a "knee kicker," as generally shown and described in the patent to Hill et al., U.S. Pat. No. 3,374,023, issued on Mar. 19, 1968. However, the invention may also be applied to a carpet stretcher of the type generally shown and described in the patents to Payson U.S. Pat. No. 3,692,278, issued Sept. 19, 1972, and U.S. Pat. No. 3,693,936, issued Sept. 26, 1972. It may also be applied to any other pair of telescoping tubings where the features of the invention may be profitably employed.

In the carpet stretchers of the above Payson patents the telescoping tubings are infinitely adjustable relative to each other, which is highly desirable, but they are expensive to make and sometimes uncertain in operation.

THE INVENTION — GENERALLY

A primary object of this invention is to provide in a carpet stretcher a telescoping tubing arrangement in which the tubings may be infinitely adjustable relative to each other, in which the tubings may be rigidly locked in any desired position of relative extension against relative movement in one direction, yet in which they may readily be unlocked to permit relative free movement in both longitudinal directions relative to each other. Another object of the invention is to provide a locking mechanism for such a tubing arrangement which is relatively cheap to make and lighter in weight than prior similar mechanism, such as those shown in the above Payson patents.

A further object of the invention is to provide such a locking mechanism which includes shoes which move radially into and out of locking engagement with the outer tubing, the shoes tending to stick to the outer tubing when there is relative longitudinal movement of the inner and outer tubings.

Still another object is to provide such a locking mechanism in which the shoes are spring biased towards their locking positions, but in which the amount of effort required to move the inner tubing longitudinally relative to the outer tubing in a free direction can be varied by changing the bias of the spring means, or otherwise. For example, in a knee kicker it is desirable to make it relatively difficult to move the tubings relative to each other in the free direction, whereas in carpet stretchers of the type shown in said Payson patents it is desirable to make it easy to move the tubings relative to each other in the free direction.

Other objects and advantages of the invention will appear from the following detailed description.

THE DRAWING

In the drawing:

FIG. 1 is a longitudinal elevational view of a knee kicker, partly in section;

FIG. 2 is an enlarged cross-sectional view on line 2—2 of FIG. 1;

FIG. 3 is an enlarged cross-sectional view on the line 3—3 of FIG. 1;

FIG. 4 is an enlarged cross-sectional view on the line 4—4 of FIG. 1; and

FIG. 5 is an enlarged cross-sectional view on the line 5—5 of FIG. 1.

DETAILED DESCRIPTION OF THE INVENTION

Referring to the drawing, FIG. 1 shows a knee kicker 10 having a head 11 provided with carpet engaging pins 12, the head being rigidly connected to an outer tubular member 13 by a neck 14 and screws 14a. The knee kicker 10 also includes a butt member 15 provided with a pad 16, the butt member being rigidly connected to an inner tubular member 17 which telescopes into the outer tubular member 13. The outer tubular member 13 is provided in its inner wall with a pair of parallel longitudinal grooves 18, which preferably are diametrically opposite to each other. The neck 14 is provided with a pair of diametrically spaced ears 19 (see FIG. 5) which extend into the grooves 18.

To the outer end of the outer tubular member 13 is secured a spacer element 20 by screws 21, the element 20 having a pair of ears 22 extending into the grooves 18. Formed in the inner tubular member 17, adjacent to its inner end, are a pair of diametrically spaced slots 23 and 23a.

In the inner tubular member 17, in the area of the slots 23 and 23a is a wedge unit 24. The wedge unit 24 has a generally rectangular head 25 at one end, longitudinally extending generally rectangular spring channels 26 and 26a, four projecting ears 27 (FIGS. 4 and 5) that fit into the grooves 18, and a plurality of spaced wedge plates 28. The wedge unit 24 is rigidly secured to the inner tubular member 17 by transverse pins 29 (FIGS. 1 and 4).

Projecting radially through the slots 23, spring channels 26 and 26a, and into the grooves 18 are a pair of identical shoe members 30, each of which is provided with a frictional outer surface 31 (FIGS. 1 and 3) formed of rubber, or rubber-like material, bonded or otherwise secured to their respective shoe members. Each of the shoe members is provided on its inner surface with a sloping shoe ramp 32, the shoe ramps diverging towards the butt member 15. The shoe members 30 are radially and longitudinally movable in the slots 23 relative to the inner tubular member 17 and ride on the wedge plates 28.

Also mounted in the inner tubular member 17 and longitudinally movable with respect thereto is a release member 33 having ears 35 which extend into the grooves 18. Rigidly connected to the release member 33, by a press fit or otherwise, is a push rod 36. An adjustment screw 39 is provided in the inner end of the trigger 37 and engages the outer end of the push rod 36, the screw being adjustable to vary the effective length of the push rod. The outer end of the push rod 36 engages a release trigger 37 pivoted on a pivot pin 38 to the butt member 15.

Within each of the spring channels 26 and 26a is a compression spring 41, each of which engages an end of one of the shoe members 30 and exerts a biasing force thereon tending to move the shoe member to the right (as seen in FIG. 1) and causing it to move up on the wedge plates 28 to, in turn, cause the shoe member to move radially outwardly into frictional engagement with the inner wall of the matching groove 18.

In a usual operation of the knee kicker 10, the pins 12 of the head 11 are hooked into a carpet and the operator exerts a leftward force (as seen in FIG. 1) on the pad 16, as by pushing or hitting the pad with his knee.

Such force is exerted through the inner tubular member 17 on the wedge unit 24, to which the wedge unit is rigidly secured by the pins 29, tending to move the wedge plates 28 of the wedge unit to the left (as seen in FIG. 1), which tends to move the shoe members 30 radially outwardly into locking engagement with the outer tubular member 13 and preventing any substantial further relative telescoping movement of the inner tubular member relative to the outer tubular member. Thus, such force applied to the pad 16 is transmitted through the butt member 15, the inner tubular member 17, the wedge unit 24, the shoes 30, the outer tubular member 13, the neck 14, and the head 11 to the pins 12, to stretch the carpet. Force member 33 is not intended to prevent movement of the shoes to the right when force is applied to the pad during kicking. Force member 33 serves only to push the shoes to the left when the trigger is depressed or when the inner tube is fully extended to the right and force member 33 hits the spacer ears 22. If member 33 stopped the shoes 30 from moving to the right (relative to the inner tube 17) it would prevent them from functioning. The knee kicker 10 may then be lifted bodily so as to unhook the pins 12 from the carpet and the pins may be rehooked in another location on the carpet to ready the knee kicker for another similar application of stretching force to the carpet in such other location.

To adjust the spacing of the head 11 and butt member 15 and the effective combined length of the inner and outer tubular members 17 and 13, which is frequently desirable in stretching carpet, the butt member is drawn manually away from the head (to the right, as seen in FIG. 1), carrying with the butt member the inner tubular member 17 and the wedge unit 24, which tends to draw the wedge plates 28 out from between the shoes 30 and thus removing the outward locking force applied by the wedge plates to the shoes and permitting the shoes to move longitudinally relative to the outer tubular member 13. The compression springs 41, however, continue to exert small forces on the shoes 30 which prevent them from completely disengaging from the outer tubular member 13 and maintaining slight friction between the shoes and outer tubular member, making it slightly difficult to draw the inner tubular member 17 out of the outer tubular member, which is a feature of the invention. The position of the parts as shown in FIG. 1, and their operation as just described, may be referred to as their normal locking position and operation, in which the inner and outer tubular members 17 and 13 are locked against telescoping together but are relatively free to be separated.

By manually rotating the trigger 37 counterclockwise (as seen in FIG. 1) the push rod and force member 33 are moved to the left, the force member exerting a leftward force on the shoe members 30 moving them to the left and off the wedge plates 28, against the compression of the springs 41, which releases the locking engagement of the shoes with the outer tubular member 13, permitting the inner and outer tubular members to be moved relatively freely in either longitudinal direction relative to each other so long as the trigger is manually maintained in its depressed position. Upon release of the trigger, the parts resume their normal locking positions in which the inner and outer tubular members cannot be telescoped together but are readily separable, as described above.

As will be understood from the foregoing, all of the relatively movable parts are keyed together, directly or indirectly, to prevent any substantial relative rotation therebetween, which is another feature of the invention.

Although a preferred embodiment and use of the invention has been described herein, it is to be understood that I do not desire to be limited thereto but desire to be afforded the full scope of the following claims.

I claim as my invention:

1. In an assembly of telescoping tubular members having releasable locking means therebetween, the combination of:
   an outer tubular member;
   an inner tubular member concentric in said outer tubular member;
   a pair of shoe members in said outer tubular member and radially movable therein into and out of engagement with the inner wall of said outer tubular member;
   wedge means extending between said shoe members and longitudinally movable with respect thereto in one direction to move said shoe members radially outwardly into locking engagement with said outer tubular member and in an opposite direction to permit said shoe members to move radially inwardly out of locking engagement with said outer tubular member;
   connecting means connecting said wedge means and said inner tubular member so that longitudinal movement of said inner tubular member in said one direction similarly moves said wedge means in said one direction and movement of said inner tubular member in said opposite direction permits movement of said wedge means in said opposite direction; and
   release means connected to said shoe members, independent of said connecting means and movable to move said shoe members in said one direction and out of locking engagement with said wedge means.

2. An assembly as defined in claim 1 in which said release means extends externally of said outer tubular member.

3. An assembly as defined in claim 1 in which said outer tubular member is provided with a pair of longitudinal grooves in its inner wall and each of said shoe members extends into one of said grooves and is confined thereby against circumferential relative movement between said shoe members and said outer tubular member but permitting relative longitudinal movement therebetween.

4. An assembly as defined in claim 1 in which spring means is provided, engageable with said shoe members and biasing the same in said opposite direction.

5. An assembly as defined in claim 1 in which spacer means are provided between said inner and outer tubular members to maintain the same in spaced but concentric relationship.

6. An assembly as defined in claim 1 provided with a head rigidly connected to one of said tubular members, said head having carpet engageable pins projecting from one side thereof, and having a butt member rigidly connected to the other one of said tubular members, the interconnection between said outer and inner tubular members preventing relative rotation between said head and said butt member.

7. An assembly as defined in claim 1, in which said outer tubular member, said inner tubular member, said shoe members, said wedge means, and said connecting means are keyed together to prevent any substantial relative rotation therebetween.

* * * * *